United States Patent [19]

Derrah

[11] Patent Number: 5,110,581
[45] Date of Patent: May 5, 1992

[54] CHLORINE DIOXIDE GENERATION

[75] Inventor: Russell I. Derrah, Oakville, Canada

[73] Assignee: Marsulex Inc., Ontario, Canada

[21] Appl. No.: 591,095

[22] Filed: Oct. 1, 1990

[30] Foreign Application Priority Data

Sep. 29, 1989 [CA] Canada .................. 614843

[51] Int. Cl.[5] .............................. C01B 11/02
[52] U.S. Cl. ..................... 423/479; 423/478
[58] Field of Search .................... 423/479, 478

[56] References Cited

U.S. PATENT DOCUMENTS

| | | | |
|---|---|---|---|
| 2,676,089 | 4/1954 | Wagner | 423/479 |
| 2,736,636 | 2/1956 | Day et al. | 423/479 |
| 2,871,397 | 1/1959 | Rapson | 423/478 |
| 3,058,808 | 10/1962 | Ernest | 423/479 |
| 4,325,934 | 4/1982 | Swindells et al. | 423/479 |
| 4,961,918 | 10/1990 | Novell et al. | 423/479 |

FOREIGN PATENT DOCUMENTS 434213 4/1946 Canada .
1079931 6/1980 Canada .

OTHER PUBLICATIONS

Fasullo, O. T., "Sulfuric Acid Use and Handling", McGraw-Hill, N.Y., 1965, pp. 119-130.

*Primary Examiner*—John Niebling
*Assistant Examiner*—Brian M. Bolam
*Attorney, Agent, or Firm*—Cushman, Darby & Cushman

[57] ABSTRACT

A process for the generation of chlorine dioxide from an alkali metal chlorate is provided that employs a waste sulphuric acid containing oxidizable organic material. Alkylation waste sulphuric acid from petroleum refining is particularly useful in this process. Conventional chlorate reducing agents used in the generation of chlorine dioxide can be partially or completely replaced by the organic material contained in the alkylation waste acid.

8 Claims, No Drawings

CHLORINE DIOXIDE GENERATION

The present invention relates to a process for the generation of chlorine dioxide from an alkali metal chlorate.

BACKGROUND OF THE INVENTION

Chlorine dioxide is commercially generated by the reduction of an alkali metal chlorate, such as sodium chlorate, with an appropriate reducing agent in a strongly acidic aqueous medium. Common reducing agents include chloride ion, sulphur dioxide and methanol. The strongly acidic aqueous medium is usually provided by a concentrated sulphuric acid, at an appropriate acid normality in the range of from about 3 to about 10 depending on the nature of the generation process employed.

In the method of chlorine dioxide generation using chloride ion as the reducing agent, the chloride ion is most commonly provided by sodium chloride or by hydrochloric acid. However, contributing to the relative chemical inefficiency of this method is the accompanying generation of unwanted chlorine. Also, the high cost of chemicals, i.e. hydrochloric acid, and hazards from "puffing" (explosions caused by decomposition of the chlorine dioxide) detract from the desirability of this method.

The generation of unwanted chlorine can be avoided by employing sulphur dioxide or methanol as the reducing agent in sulphuric acid medium to generate chlorine dioxide. However, the chemical inefficiency of the method in the past in regards the yield of chlorine dioxide generated with respect to chlorate conversion and reducing agent effectiveness, together with the hazards from "puffing" have remained as serious drawbacks.

Canadian Patent No. 434,213, issued April 1946 to The Mathieson Alkali Works, discloses a process for producing chlorine dioxide from chlorate in the presence of sulphuric acid using a restricted (or controlled) amount of an organic, water-soluble reducing agent, such as a water-soluble aldehyde, alcohol, carbohydrate, organic acid, or starch. The invention described therein is predicated upon the amount of reducing agent added being so restricted that over-reduction of the chlorate is substantially avoided, and the danger of explosive reaction is practically eliminated.

U.S. Pat. No. 2,736,636 (1956) of Day et al. discloses the production of chlorine dioxide by the use of increased amounts of reductant with simultaneous utilization of much less quantities of sulphuric acid. Suitable reductants disclosed include organic materials described as alcohols, aldehydes, organic acids and sugars, specifically, wood pulp, kraft pulping process waste liquor, molasses and starch. It is recognized that these materials are highly oxygenated (contain a large proportion of oxygen). Furthermore, U.S. Pat. No. 2,736,636 discloses the separate addition of the reductant to the process described therein.

It has not been described how to improve the efficiency of the method without also increasing the safety hazards incident to "puffing" and high heat generation which would accompany any such increase in efficiency. Nor has it been described how to improve the efficiency of the reaction compatibly with generation of the chlorine dioxide in a form free from the spent or residual materials contained in the liquor.

It is common practice in petroleum refineries to treat low boiling isoparaffins or alkanes with alkylating reagents such as olefins, in the presence of sulphuric acid as a catalyst, to produce a high octane alkylate boiling in the gasoline range. It is well known that the sulphuric acid catalyst, commonly termed alkylation acid, does not undergo major chemical change during the alkylation process but the acid concentration diminishes due to the build-up of water and organic impurities or "red oils" originating from undesired side reactions. As the build-up of the water and red oil diluents approaches 10-12%, the concentration of the alkylation acid is reduced from its original value of about 98.0-99.5% to about 86-90%. At these lower concentration values, the catalytic activity of the alkylation acid is decreased and the octane number of the product alkylate is undersirably lower. At this point the alkylation acid is withdrawn from the system, is known as alkylation waste acid, and is reprocessed by regeneration. This alkylation waste acid typically contains about 3-6% by weight of water and about 3-8% by weight of organic materials. The nature of the organic materials, or "red oils", in the waste acid is complex since they are derived from cyclic and acyclic aliphatic compounds, and includes mixtures of alkanes, alkenes and sulphonated derivatives thereof. In reprocessing, the alkylation waste acid is usually thermally decomposed to sulphur dioxide, carbon dioxide and water. After purification, the sulphur dioxide generated is reconverted to sulphuric acid by the conventional contact process.

Besides the energy required for the acid regeneration, another obvious disadvantage of this widely used destructive regeneration process is that the alkylation waste acid is completely decomposed to eliminate the organic material impurities. Analyses of alkylation waste acid vary somewhat depending on the operating conditions.

SUMMARY OF INVENTION

Now, surprisingly, we have found that chlorine dioxide can be conveniently generated using a sulphuric acid that already contains oxidizable organic material, for example, using an alkylation waste acid containing organic material from the petroleum refining industry, both as an acid source of sulphuric acid and as a reducing agent for the chlorate.

This finding is particularly surprising owing to the fact that chlorine dioxide, which is a strong oxidizing agent, reacts readily with a wide variety of organic materials. Therefore, heretofore, the presence of such oxidizable organic material in the chlorine dioxide generation medium was avoided or significantly restricted since an adverse effect on yield would have been expected, and the frequency and strength of "puffing" would be expected to increase.

Furthermore, alkylation waste acid has constituted a disposal problem for years to the oil industry, yet treatment of this acid to destructive regeneration has remained, and relatively expensive virgin sulphuric acid is used in the generation of chlorine dioxide.

It is an object of the present invention to provide an economical process for the generation of chlorine dioxide.

It is a further object of the present invention to productively utilize waste sulphuric acid as a means of its disposal, particularly in the case of alkylation waste acid, in order to avoid the necessity of its destructive regeneration.

Accordingly, the present invention provides a process for the generation of chlorine dioxide from an alkali or alkaline earth metal chlorate, said process comprising treating said chlorate in an aqueous reaction medium comprising a waste sulphuric acid containing oxidizable organic material. Said organic material preferably comprises cyclic or acyclic alkyl or alkenyl compounds. Also, preferably, at least a portion of said oxidizable organic material comprises such compounds having 5 or more carbon atoms.

DETAILED DESCRIPTION OF INVENTION

The chlorates of use in the present invention are soluble in the reaction medium, and sodium chlorate is preferred.

Sulphuric acid suitable for use in the practice of the present invention includes waste sulphuric acids, having the indicated characteristics, from the industrial processes shown in Table 1.

TABLE 1

| Process Waste Acid | Approx. Percent By Weight Sulphuric Acid | Concentration Of Organic Material (% Carbon by weight) |
|---|---|---|
| Nitration | 65–75 | 0.01–1 |
| Nitric Acid Concentrator | 60–75 | 0.001–1 |
| Chlorine Drying | 70–85 | 0.001–0.1 |
| Sulphonation/Sulphation | 65–95 | 0.001–6 |
| Ion Exchange Resin Manufacture | 70–95 | 0.001–3 |
| Alcohol Manufacture | 70–90 | 0.1–4 |
| Herbicide Manufacture | 70–90 | 0.1–25 |
| Organic Chemical Manufacture | Variable | 0.001–25 |

The oxidizable organic material contained in said waste sulphuric acid comprises cyclic or acyclic alkyl or alkenyl compounds, which may be optionally substituted, and includes oxidizable cyclic or acyclic alkanes or alkenes or aromatic compounds, or derivatives thereof, preferably sulphonated derivatives thereof, as would be present in sulphuric acid. The oxidizable organic material is preferably soluble in said sulphuric acid.

In the process according to the present invention, said aqueous reaction medium is derived from a waste sulphuric acid that contains said oxidizable organic material. Preferably, said aqueous reaction medium is derived from a concentrated waste sulphuric acid that contains said oxidizable organic material. By the term concentrated waste sulphuric acid is meant those waste sulphuric acids that contain greater than about 80% sulphuric acid. Yet more preferably, said waste sulphuric acid is an alkylation waste acid.

The organic material contained in alkylation waste sulphuric acid is particularly suitable, and the components of the organic material contained therein include sulphate esters of the olefins used in the alkylation process, sulphate and sulphonic acids derived from hydrocarbons in the alkylation process, and "red oils" which are highly olefinic, conjugated cyclic hydrocarbons with from two to five cyclopentyl groups.

The alkylation waste acid may be provided as a concentrated sulphuric acid of a strength greater than about 85% sulphuric acid and containing from about 2% to about 10% of organic material. More preferably, said alkylation waste acid is of a strength greater than about 90% sulphuric acid and containing from about 4% to about 6% of organic material.

The waste sulphuric acid of use in the process of the present invention may be added as it is available as waste from the particular process from which it is produced, or may be mixed with acceptable sulphuric acids available from other sources.

It can be readily understood that the sulphuric acid containing organic material of use in the present invention can be simulated by direct preparation and need not necessarily emanate from a waste acid source. Such a simulated waste acid may be produced by treating concentrated sulphuric acid with a suitable hydrocarbon material. For example, sparging butene into sulphuric acid with mixing at a temperature from about 2° C. to 10° C. and a pressure from about 30 to 100 psig can be used to produce such a sulphuric acid. Suitable hydrocarbon material that can be used in the preparation of a simulated acid for use in the present invention is hydrocarbon material capable of forming conjunct polymers, such as hydrocarbon material comprising an alkene, alkyne, or branched alkane, or derivatives thereof, including cyclic derivatives; however, alkenes are preferred since they react rapidly to give conjunct polymers. Also, it will be understood that a suitable sulphuric acid can be prepared by mixing either fresh acid or hydrocarbon to an existing waste acid.

Further, in a preferred process according to the present invention, said aqueous reaction medium further comprises a conventional alkali or alkaline earth metal chlorate reducing agent. The reducing agent may be provided solely by the organic material contained in the waste sulphuric acid, or may comprise a mixture of organic material and a suitable compound presently known to be useful in chlorine dioxide generation as a reducing agent. Examples of such known reducing agents include chloride ion, sulphur dioxide, methanol and oxalic acid.

In the practice of the process of the present invention, chlorine dioxide can be generated as is presently carried out using any of the processes currently available or described for the reduction of an alkali metal chlorate in an aqueous reaction medium containing sulphuric acid, with only minor process modifications as would be understood by one skilled in the art.

Suitable processes for adopting to the process of the present invention include those processes known in the art and refered to as Mathieson (described in CA 652,250), R2 (described in CA 543,589), and Solvay (described in U.S. Pat. No. 4,081,520).

Preferred embodiments of the present invention are illustrated by means of the following Examples.

EXAMPLE I

The method used for generating chlorine dioxide involves the reduction of sodium chlorate with oxalic acid; as illustrated in the following reaction:

$$2NaClO_3 + (COOH)_2 \cdot 2H_2O + H_2SO_4 \rightarrow 2ClO_2 + 4H_2O + 2CO_2 + Na_2SO_4$$

A general procedure for this method is to mix the sodium chlorate and oxalic acid in a gas evolution flask and add to the mixture the appropriate quantity of 9N sulphuric acid at a rate such as to not allow the temperature to rise much above ambient. The chlorine dioxide is collected in water at 5° C.

Specifically in this example, to a reaction vessel equipped with an air sparger was added 16.3 g sodium chlorate, 15.0g oxalic acid, and 49 g water. The mixture was sparged with air at a rate of 200 cc/min. To this mixture was added 26.6 g of virgin 93% sulphuric acid over a period of 30 minutes. The temperature of the reaction mixture was maintained at the described conditions for an additional 30 min. The purge gas was scrubbed with 1.7 liters of chilled water circulating in a packed column. On completion of the experiment the water was analysed for chlorine dioxide by titration using a potassium iodide-thiosulfate standard test method. The results are shown in Table 2 under run #1. The 1.7 liters of water contained 1.64 g of chlorine dioxide, corresponding to a 15.6% yield of chlorine dioxide based on chlorate.

EXAMPLE II

The conditions are as described in Example I, except that the virgin 93% acid was replaced with an equivalent amount (27.5 g) of alkylation waste acid (AWA). The AWA analysed for 91.8% $H_2SO_4$, 4.2% $H_2$, 3.8% C, and 0.2% $SO_2$. The results are shown in Table 2 under Run #2. The reaction produced 1.95 g of $ClO$, corresponding to a $ClO_2$ yield of 18.6%.

EXAMPLE III

The conditions were as described in Example II, except that only 9.6 g of oxalic acid was added to the reactor. The results of the experiment are recorded in Table 2 under Run #3. the reaction produced 1.56 g of $ClO_2$, corresponding to a yield of 15.0%.

EXAMPLE IV

To the reactor described in Example I was added 16.3 g of sodium chlorate and 30 g of water. The oxalic acid was totally excluded from the reaction mixture in this example. The reaction temperature was maintained at 40° C. and air sparged at a rate of 200 cc/min for the duration of the experiment. AWA (27.5 g) was added in the manner described in Example I. The results are shown in Table 2 under Run #4. The reaction produced 0.4 g of $ClO_2$, corresponding to a yield of 3.8%.

EXAMPLE V

The conditions were as described in Example IV, except that a total of 75.7 g of AWA was added to the reactor over the prescribed time period. The results of the experiment are recorded in Table 2 under Run #5. The reaction produced 2.17 g of $ClO_2$, corresponding to a yield of 20.8%.

TABLE 2

| Run # | NaClO$_3$ (g) | Oxalic Acid (g) | H$_2$O (g) | AWA* (g) | Virgin 93% H$_2$SO$_4$ | % Yield (ClO$_2$) |
|---|---|---|---|---|---|---|
| 1 | 16.3 | 15.0 | 49.2 | — | 26.6 | 15.6 |
| 2 | 16.3 | 15.0 | 49.2 | 27.5 | — | 18.6 |
| 3 | 16.3 | 9.6 | 49.2 | 27.5 | — | 15.0 |
| 4 | 16.3 | — | 30.0 | 27.5 | — | 3.8 |
| 5 | 16.3 | — | 30.0 | 75.7 | — | 20.8 |

*Alkylation waste acid (AWA) analysis: 91.8% sulphuric acid, 4.2% water, 3.8% carbon, 0.2% sulphuric dioxide.

The data listed in Table 2 shows that AWA can effectively replace virgin 93% $H_2SO_4$, as the source of acidity for the generation of chlorine dioxide from sodium chlorate and oxalic acid. More importantly the data show that the organic material contained in the AWA can act as the reducing agent in the reaction, supplementing or replacing oxalic acid. A comparison between Runs #1 and 2 shows that direct replacement of virgin 93% $H_2SO_4$ results in 3% improvement in chlorine dioxide yield. This is more than can be accounted for by the small amount of sulphur dioxide in the AWA; assuming 100% conversion of the $SO_2$ present, the maximum expected yield increase would be 1.3%, relative to Run #1.

Runs 3 through 5 illustrate that the organic material contained in a waste sulphuric acid can effectively augment or replace the oxalic acid as reducing agent.

What is claimed is:

1. A process for the generation of chlorine dioxide from an alkali or alkaline earth metal chlorate, said process comprising treating said chlorate in an aqueous reaction medium comprising sulphuric acid wherein said sulphuric acid in said reaction medium is alkylation waste sulphuric acid comprising oxidizable cyclic or acyclic alkyl or alkenyl compounds.

2. A process as claimed in claim 1, wherein said alkylation waste sulphuric acid contains 2 to 10% oxidizable cyclic or acyclic alkyl or alkenyl compounds.

3. A process as claimed in any one of claims 1 or 2 wherein said aqueous reaction medium further comprises a conventional alkali or alkaline earth metal chlorate reducing agent.

4. A process as claimed in any one of claims 1, or 2 wherein said aqueous reaction medium further comprises a conventional alkali or alkaline earth metal chlorate reducing agent selected from the group consisting of chloride ion, sulphur dioxide, methanol and oxalic acid.

5. A process as claimed in any one of claims 1 or 2 wherein said aqueous reaction medium further comprises a conventional alkali or alkaline earth metal chlorate reducing agent selected from the group consisting of methanol and oxalic acid.

6. A process as claimed in any one of claims 1 or 2 wherein said alkali metal chlorate is sodium chlorate.

7. A process as claimed in claim 1 wherein said compounds having 5 or more carbon atoms.

8. A process as claimed in claim 1, wherein said alkylation waste sulphuric acid comprises greater than about 85% sulphuric acid and from about 2% to about 10% of organic material.

* * * * *